March 29, 1932.    S. N. HURT    1,851,516
INDICATING CHART
Filed Jan. 12, 1931    2 Sheets-Sheet 1
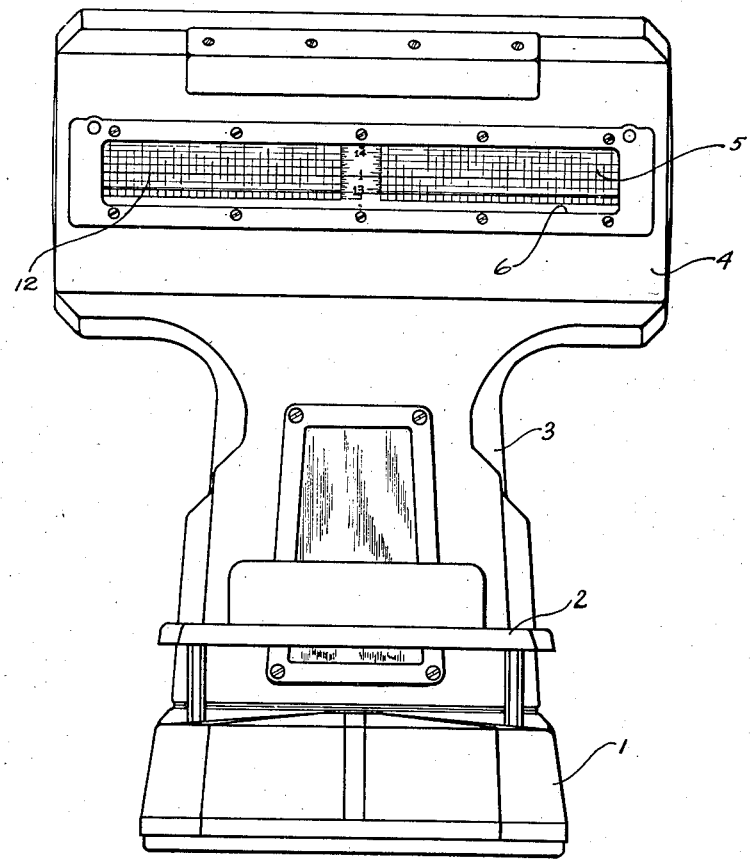
Fig—I
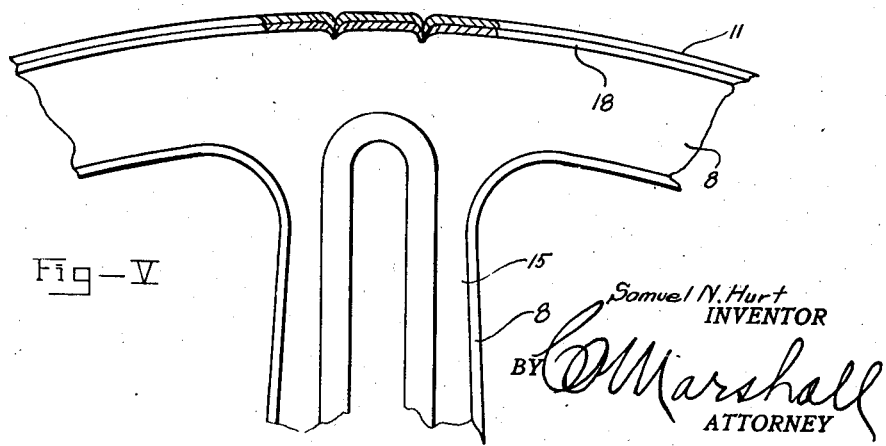
Fig—V
Samuel N. Hurt
INVENTOR
BY C. Marshall
ATTORNEY March 29, 1932.  S. N. HURT  1,851,516
INDICATING CHART
Filed Jan. 12, 1931  2 Sheets-Sheet 2
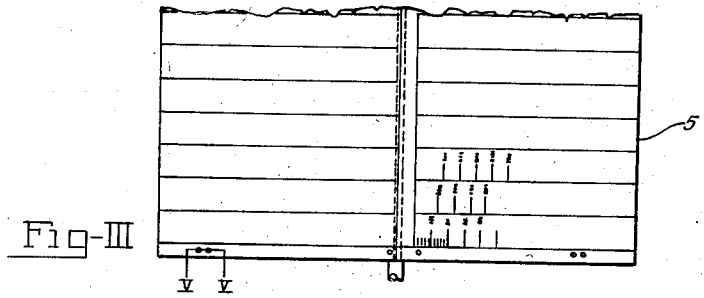
Fig-III
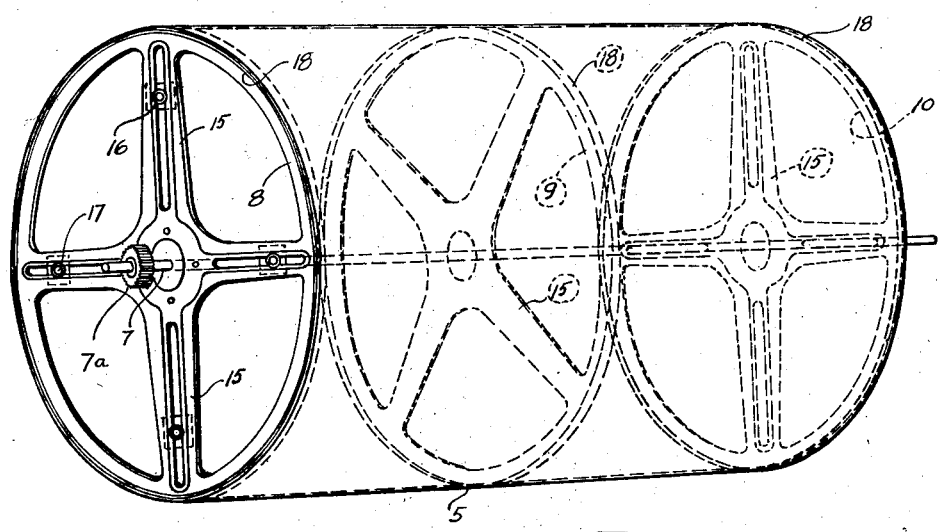
Fig-II
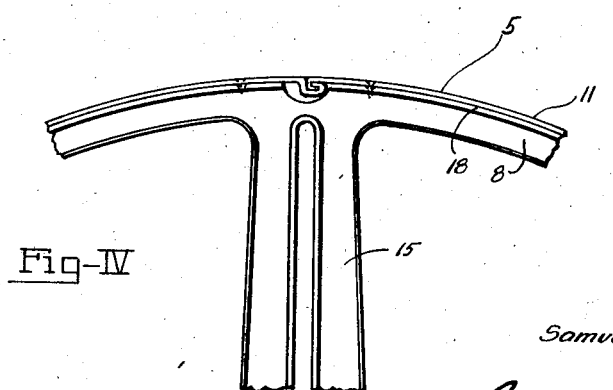
Fig-IV
Samuel N. Hurt
INVENTOR.
BY C. C. Marshall
ATTORNEY.

Patented Mar. 29, 1932

1,851,516

UNITED STATES PATENT OFFICE

SAMUEL N. HURT, OF TOLEDO, OHIO, ASSIGNOR TO TOLEDO SCALE MANUFACTURING COMPANY, OF TOLEDO, OHIO, A CORPORATION OF NEW JERSEY

INDICATING CHART

Application filed January 12, 1931. Serial No. 508,232.

This invention relates to weighing scales such as are used in retail shops and in particular to such scales which employ a rotatable cylindrical chart to indicate the weight and the computed money value of a commodity. The usual way of constructing these charts is to make a light framework over which a cylinder of paper is slipped on which the weight and value graduations are printed. This paper cylinder is then fastened to the framework by staples made of thin wire. It has been attempted to substitute a sheet of thin aluminum for the paper on which the indicia are printed, but scales constructed with aluminum charts were soon abandoned as the construction, particularly the heretofore known methods of making the seam or joint and the method of retaining the cylindrical sheet portion of the chart to the framework, were unsatisfactory. In scales of this kind an index line, which is usually a thin wire, must be stretched across the chart a very short distance from it to prevent errors in reading the indication due to parallax. The seams or joints heretofore made, however, projected such a distance from the surface that the indicating wire had to be stretched a considerable distance away from the chart to prevent the seam from striking it. This resulted in a great many errors due to the aforementioned parallax. Staples are used in fastening the paper cylinder to the framework of cylinder sheets at the present time, but as paper is easily compressible, the staple is embedded and therefore the outer surface of the chart remains flush. When a sheet of aluminum is used in forming the cylinder, the staples also project consequently other retaining means must be employed in fastening the cylinder to the framework.

A further objectional feature of the previous attempts to employ an aluminum chart consisted in that metallic polished surface reflected light, similar to a mirror, and indicia printed thereon were hard to read. Attempts to obviate these objections by coating the surface with paint resulted in a prohibitive increase in weight.

It is essential that rotary parts, such as the herein described chart, in scales, be as light as possible so that the inertia, of the part, occasioned by the rotation, is as small as possible. The reason for this is obvious. Although a sheet of paper of a given size is lighter than a sheet of aluminum of equal size; the thickness of each sheet being suitable for the purpose; the assembled paper chart will weigh more, as owing to the hygroscopic qualities of the paper it must be thoroughly sealed against absorption of atmospheric moisture. This absorption by paper is not uniform and unless prevented entirely, the condition of static balance of the chart would soon be destroyed. Scale manufacturers therefore seal the paper against moisture by applying several coats of lacquer. As many as seven coats have been applied to charts intended to be used in the humid atmosphere of the tropics; an aluminum chart requires no special treatment against the absorption of moisture and in spite of the greater specific gravity of the material is considerably lighter than a paper chart which must be fully protected.

The primary object of this invention is therefore the improved construction of an aluminum chart which is adapted to obviate the difficulties hereabove referred to.

Another object of the invention is the provision of a chart of non-hygroscopic material.

Another object of the invention is the provision of means for making a cylindrical chart for scales in which the thickened portion of the seam or joint is disposed in the interior of the cylinder leaving the periphery smooth and perfectly round.

Another object of the invention is the provision of means for treating the polished surface of a metallic chart by means of chemical action so that it becomes non-reflecting.

A still further object of the invention is the provision of means for fastening the cylinder to a framework without the aid of staples or other extraneous means.

Other objects and advantages will be apparent from the following description in which reference is had.

In the drawings:—

Figure I is a front elevation of a cylinder embodying my improved chart.

Figure II is an enlarged perspective view of a cylinder chart embodying the invention.

Figure III is an enlarged fragmentary plan view of a cylinder chart showing a preferred method of fastening the chart cylinder to the frame.

Figure IV is an enlarged fragmentary end elevation of the chart and frame showing the construction of the seam in detail.

Figure V is an enlarged fragmentary portion of the chart and frame, a portion broken away substantially along the line V—V of Figure III and showing the method of fastening the chart cylinder to the frame.

Scales employing cylindrical charts of the type in which I have shown my invention embodied are well known and I will therefore describe the scale per se only so far as is necessary to properly disclose my invention.

Referring to the drawings in detail, a base 1 suitably houses a load receiving lever mechanism (not shown) on which a load receiver 2 is mounted. A housing 3 contains a load counterbalancing mechanism which may be of any preferred type and which is operatively connected to an indicating mechanism located within the casing 4. This indicating mechanism comprises an aluminum chart 5 in which the indicating surface is rendered non-reflecting by the deposition of a coating of aluminum oxide. The chart 5 is exposed to view through an opening 6 in the casing 4. The chart 5 comprises a steel shaft 7 upon which, adjacent the ends, chart spiders 8 and 10 are fastened to suitable hubs. The spiders may have any desired number of arms; but the center of mass of each should be substantially at its axis. A pinion 7a is fastened adjacent one of the ends and it is through this pinion that the reciprocating motion of the counterbalancing mechanism is translated into rotation. The spider 9 is located intermediate the spiders 8 and 10 and differs from them in that it is not fastened to the shaft, but is held in place by a cylinder of aluminum 11 to which its periphery is cemented. The purpose of the spider 9 is to prevent the central portion of the chart cylinder from sagging. The cylinder 11 is formed from a single sheet of aluminum. The folded seam which connects the ends of the sheet from which the cylinder is formed, differs from the ordinary seam by the fact that its folds are adapted to be disposed entirely within the interior of the cylinder. The outside surface is continuous and absolutely flush. As the chart is perfectly round, and there are no projections, an indicating wire 12 can be stretched very close to the chart across the opening 6 in the casing 5.

To accommodate the folds of the seam 13 in the interior of the chart, the spiders 8, 9 and 10 have a small segment 14 cut out of their peripheries (see Figure IV). These segmental cutouts are substantially on the longitudinal axis of a spider arm 15 so that the additional weight of the folds may be counterbalanced by the weights 16 which are adjustable along the axis of the spider arms. The purpose of the adjustable weights 16 and 17 is to statically balance the chart so that no force components are set up during rotation which tend to destroy the accuracy of the scales.

When the circular chart has been assembled to the spiders, it is fastened by an improved method which does not add to the weight of the chart nor form any projection beyond the outer surface which might interfere with the location of the index wire. This is accomplished by piercing a pointed instrument through the metallic cylinder of the flanges 18 and the spiders 8, 9 and 10. This operation forces a portion of the metal of the cylinder 11 into the puncture in the flange 18. As many of these punctures may be made as are necessary to securely hold and retain the cylinder on the spider. The result is shown substantially in Figure V, and it will be readily seen that the cylinder 11 is thereby firmly secured to the framework consisting of the shaft 7 and the spiders 8 and 10.

To provide a surface suitable for printing on the cylinder 11 it is proposed to form a layer of aluminum oxide thereon; this is readily accomplished by subjecting it to the action of concentrated nitric acid for a short time after first thoroughly cleaning the sheet. The resulting surface is white, non-reflecting and indicia printed thereon is easily read.

The embodiment of my invention herein shown and described is to be regarded as illustrative only, and it is to be understood that the invention is susceptible to variation, modification and change within the spirit and scope of the subjoined claims.

Having described my invention, I claim:

1. In a device of the class described, in combination, weighing mechanism and indicating mechanism operated thereby, said indicating mechanism comprising a shaft, spiders of light material secured thereto and an aluminum cylinder surrounding said spiders, said aluminum cylinder having a folded seam below the surface thereof.

2. In a device of the class described, in combination, weighing mechanism and indicating mechanism operated thereby, said indicating mechanism comprising a shaft, spiders of light material secured thereto, a cylinder of aluminum or a light alloy containing aluminum surrounding said spiders, a film of the aluminum at the exposed surface of said cylinder having been converted to aluminum oxide.

3. In a device of the class described, in combination, weighing mechanism and indicating mechanism operated thereby, said indicating mechanism comprising a shaft, a plurality of spiders, each having arms secured to said shaft, a cylinder of light metal having an interlocked seam surrounding said spiders and weights adjustable on the arms of a spider to counterbalance the weight of said interlocked seam.

4. In a device of the class described, in combination, weighing mechanism and indicating mechanism operated thereby, said indicating mechanism comprising a shaft, a plurality of circular spiders each having a plurality of arms secured to said shaft, the axes of said arms intersecting substantially at an angle of 90°, a statically unbalanced cylinder of thin aluminum surrounding said spiders and weights adjustable on said spider arms to statically balance said chart.

5. In a device of the class described, in combination, weighing mechanism and indicating mechanism operated thereby, said indicating mechanism comprising a shaft, a plurality of spiders secured thereto having a circular periphery, a cylinder of light metal having an interlocked seam disposed in the interior of said cylinder surrounding said spiders and each of said circular spiders having a portion removed from its periphery to receive said interlocked seam.

6. In a device of the class described, in combination, weighing mechanism, indicating mechanism in co-operation therewith, said indicating mechanism including a spider having a circular periphery, a plurality of arms and a portion removed from the periphery of said spider substantially on the axis of one of said arms.

7. In a device of the class described, in combination, weighing mechanism, indicating mechanism in co-operation therewith, said indicating mechanism including a rotary chart comprising a cylinder of light metal, a light metallic framework having openings and portions of said cylinder forced into said openings to retain said cylinder to said framework.

8. In a device of the class described, a rotary chart comprising a cylinder formed from a sheet of thin aluminum having a nonglare surface of aluminum oxide, a framework including a plurality of spiders having a circular periphery and means formed by said cylinder and said spiders for fastening said cylinder to said spider.

9. A chart according to claim 8 in which the means employed to fasten the cylinder to the spiders do not project beyond the outer surface.

10. In a weighing scale, in combination, weighing mechanism, indicating mechanism operatively connected thereto, said indicating mechanism including a chart comprising a shaft, a plurality of flanged circular spiders fastened thereto, a cylinder of light, thin aluminum having an interlocking seam disposed in the interior thereof, said spiders having portions removed as clearance for said interlocking seam, a plurality of spaced openings in the flanges of said spiders and portions of said aluminum cylinder projecting through said openings.

SAMUEL N. HURT.